March 14, 1933.  B. B. PHELPS  1,901,328
LAWN MOWER SHARPENING TOOL
Filed Jan. 21, 1932
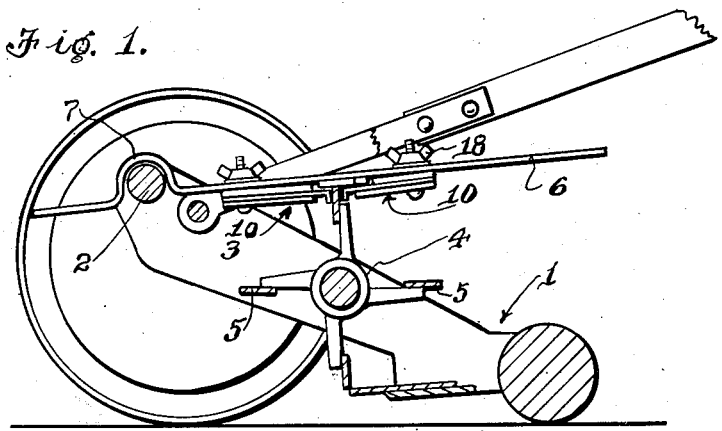
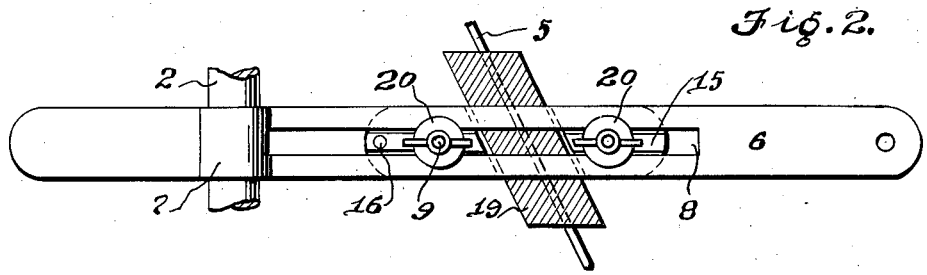
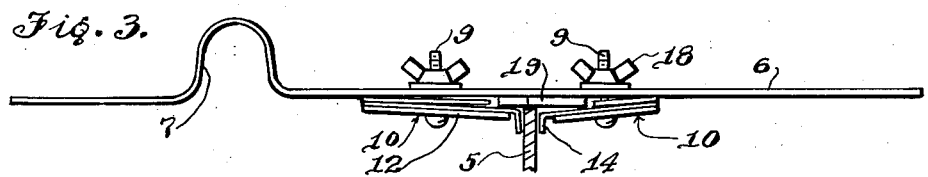
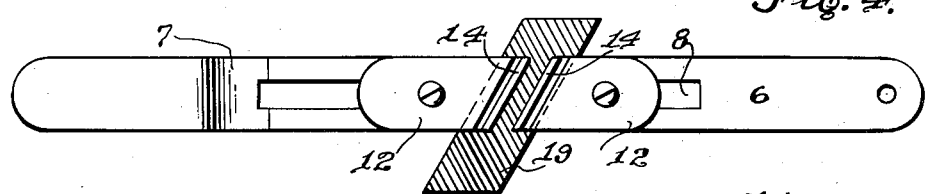
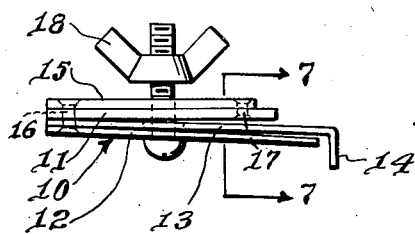
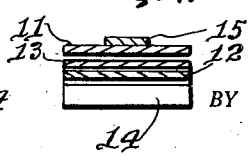
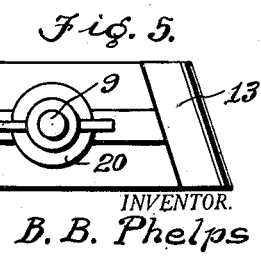
INVENTOR.
B. B. Phelps
BY J. Kaplan
ATTORNEY.

Patented Mar. 14, 1933

1,901,328

UNITED STATES PATENT OFFICE

BENJAMIN B. PHELPS, OF MINNEAPOLIS, MINNESOTA, ASSIGNOR OF ONE-THIRD TO WILLIAM J. KELLY AND ONE-THIRD TO HARRY HASKELL, BOTH OF MINNEAPOLIS, MINNESOTA

LAWN MOWER SHARPENING TOOL

Application filed January 21, 1932. Serial No. 587,994.

This invention relates to a lawn mower sharpening tool.

The main object of the invention is to provide an improved construction for a hand tool adapted to be employed for sharpening the cutting blades of lawn mower reels.

Another object of the invention is to provide means for supporting and guiding the tool when sharpening the blades.

Another object of the invention is to provide novel means for adjusting and guiding the sharpening means in relation to the cutting blades.

A further object of the invention is to provide a tool of this kind which can be adjusted to fit any type of lawn mower.

Another object of the invention is to provide novel means for resiliently and efficiently holding the sharpening means.

Other objects will appear as the disclosure progresses. The drawing is intended to merely indicate a possible embodiment of the invention. It is obvious that the needs of manufacture may necessitate certain mechanical changes. It is therefore not intended to limit the invention to the embodiment illustrated but rather to define such limits in the appended claim.

For a more general understanding of the invention attention is called to the drawing. In the drawing like reference characters denote like parts throughout the specification.

In the drawing:

Figure 1 is an elevation, partly in section, showing the improved tool mounted on a lawn mower in position for practical use.

Figure 2 is a top view of the tool.

Figure 3 is a side view thereof.

Figure 4 is a bottom view of the tool.

Figure 5 is a top view of one of the gripping elements for holding the file.

Figure 6 is a side view thereof and

Figure 7 is a section on line 7—7 of Figure 6.

Referring now to the drawing in detail, numeral 1 designates the lawn mower, 2 the usual cross bar connecting together the side frames 3, and 4 the reel on which is mounted the revolving cutter blades 5. The sharpening tool which is the subject matter of this invention comprises a frame 6 made of a single piece of strap iron and provided with an arch 7 near one end for being seated on the cross bar 2. Cut in the central portion of the frame is a longitudinal slot 8 through which pass the bolts 9 for movably supporting and adjusting the gripping elements 10.

Each of the gripping elements includes a foundation 11, a bottom plate 12, and a middle plate 13 having a downwardly bent flange 14. On top of the foundation 11 is a strip 15 which slidably fits in the slot 8 of the frame. One end of this entire structure is fastened together by the rivet 16 while at the other end the bottom plate 12 and the middle plate 13 is loosely suspended from the foundation 11. The foundation 11 and strip 15 are fastened together by the rivet 17 making one unitary structure. Passing through the center of the gripping element is a bolt 9 provided with a wing nut 18 for fastening the structure to the frame 6. As shown in Figure 6 the normal position of the outward end of the bottom plate 12 and middle plate 13 is away from the foundation for a purpose to be later described.

The purpose of the gripping elements 10 is to hold the sharpening element in place which in this instance is a file 19. The file is placed between the inner ends of the gripping elements as best seen in Figure 3 and the wing nut screwed down. This will cause the free ends of the plates 12 and 13 which are somewhat resilient to bend up and bear against the bottom of the file and hold same in place. The purpose of the resilient means is to prevent the file from getting loose due to any vibration which might develop. The file is clamped in place as seen in Figure 2 at an angle on line with the cutter blade 5. Between the wing nut and the frame is a washer 20.

In practical use the sharpening tool is mounted on the lawn mower as shown in Figure 1 and manually operated to and fro longitudinally of the rod 2 and blade 5 until the file will produce a sharp cutting edge. The downwardly bent flanges 14 which engage the sides of the blade will guide the tool in its proper path. The several blades on the reel may be filed in turn by rotary adjustments of the reel 4 to bring them successively within the range of operation of the tool.

It will thus be seen that I have provided a simple and efficient tool for sharpening lawn mower blades. The tool can be adjusted to fit all kinds of lawn mowers without any change in construction. The filing element is resiliently held in place so that it will not get loose due to any vibration. The sharpening tool can easily and quickly be replaced or its filing surface when worn down reversed thus providing a fresh sharpening surface.

Having described my invention, I claim:

In a device of the class described, the combination of a frame having an elongated slot, a file, a pair of gripping elements slidably attached to said frame, each of said gripping elements comprising a foundation disposed parallel to said frame, a plate having a downwardly bent flange attached to the bottom of said foundation, the straight portion of said plate being parallel throughout its entire length with said foundation, another plate attached to the bottom of the first mentioned plate and being parallel throughout its entire length to said foundation, a strip attached to the top of said foundation and adapted to enter said elongated slot, a bolt passing through said foundation, plate, said other plate and said strip, and a wing nut associated with said bolt for slidably fastening each of said gripping elements and file to said frame.

In testimony whereof I affix my signature.

BENJAMIN B. PHELPS.